United States Patent [19]
Gotoh

[11] 3,785,856
[45] Jan. 15, 1974

[54] OIL SEAL OR SLEEVE HAVING PRESS-FITTED PORTIONS COATED WITH SYNTHETIC RUBBER LATEX

[75] Inventor: Syuichi Gotoh, Fujisawa, Japan
[73] Assignee: Nippon Oil Seal Industry Co., Ltd., Tokyo, Japan
[22] Filed: Apr. 3, 1972
[21] Appl. No.: 240,751

Related U.S. Application Data
[63] Continuation-in-part of Ser. No. 880,988, Nov. 28, 1969, abandoned.

[30] Foreign Application Priority Data
Dec. 17, 1968 Japan.................... 43-92476

[52] U.S. Cl.............. 117/75, 117/97, 117/132 CB, 117/132 B, 117/161 UD, 117/161 UB, 277/235 A, 277/DIG. 6
[51] Int. Cl................................ F16j 15/16
[58] Field of Search.............. 117/132 CB, 132 B, 117/75, 97, 161 UD, 161 UB; 277/235 A, 277/DIG. 6

[56] References Cited
UNITED STATES PATENTS
| | | | |
|---|---|---|---|
| 2,889,163 | 6/1959 | Stephens et al. | 277/184 |
| 3,223,676 | 12/1965 | Rucker | 277/DIG. 6 |
| 2,128,635 | 8/1938 | Charch et al. | 117/79 |
| 3,085,076 | 4/1963 | Zimmerman | 117/161 UD X |

*Primary Examiner*—Ralph Husack
*Attorney*—Holman & Stern

[57] ABSTRACT

Machine elements, such as oil seals, wherein metallic press-fitted portions thereof are coated with grain-free vulcanized synthetic rubber latices to improve the sealing efficiency.

4 Claims, 1 Drawing Figure

PATENTED JAN 15 1974 3,785,856
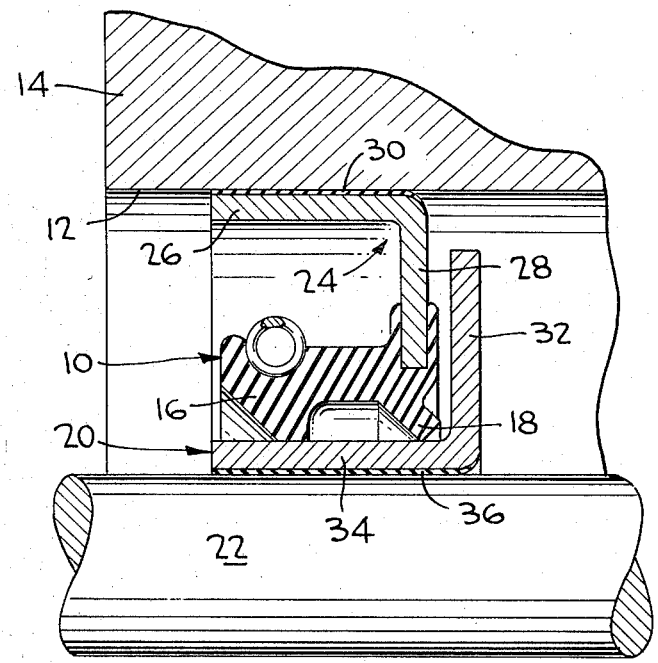

OIL SEAL OR SLEEVE HAVING PRESS-FITTED PORTIONS COATED WITH SYNTHETIC RUBBER LATEX

This application is a continuation-in-part of co-pending application Ser. No. 880,988, filed Nov. 28, 1969, now abandoned.

The present invention relates to a machine element having an improved sealing ability, and relates more particularly to a machine element such as an oil seal having a pressfit portion coated with a high molecular substance.

Oil seals, which are exemplary of the machine elements to which the present invention is directed, are press-fitted on the housing bore of a machine or the shaft thereof or run on a cylindrical sleeve press-fitted on the housing bore or the shaft. A sealing in such applications is to be achieved between the bore surface and the outer circumference of the oil seal or between the inner circumference of the sleeve and the shaft (in the case of outer seals); or between the shaft and the inner circumference of the oil seal or between the outer circumference of the sleeve and the bore surface (in the case of inner seals). Sleeves are other examples of the type of machine element for which the present invention is intended.

In such cases leakage often occurs at the sealing point, particularly if there are scratches or other irregularities to impair the surface smoothness of the bore, the shaft, the sleeve or the oil seal casing. In order to improve the sealing efficiently, it has been suggested to apply a thin coating of a high molecular weight substance on the metallic surface of an oil seal which is to have a press-fit.

As such substance, U.S. Pat. No. 2,889,163, the disclosure of which is incorporated herein by reference, utilizes thermosetting and thermoplastic resins such as acrylic, vinyl, phenolic, melamine, epoxy, alkyl and aryl resins. In this patent, an elastomer such as rubber is said to be unsatisfactory as a high molecular weight coating substance, because it is necessary for shearing to keep applying force in the same direction, a requirement that was said to be incapable of satisfaction by a natural or synthetic rubber coating. Such rubbers are said to have grain surface because of the flow of the material at vulcanization, resulting in an improper shearing, the materials breaking along the grain, instead of shearing.

While it was recognized that the aforementioned resin materials were better than rubbers having grains to cause an improper shearing, such materials still have certain disadvantages. A coating made of these resins is lacking in elasticity and may crumble in the bore of a machine in which the oil seal is mounted. Additionally, where scratches on the bore are deep, such materials are unable to flow sufficiently to fill them. To overcome such deficiencies, U.S. Pat. No. 3,275,332, the disclosure of which is incorporated herein by reference, proposes an oil seal having its metallic press-fit surface coated with chlorosulfonated polyethylene (Hypalon). However, the vulcanizing time of the suggested chlorosulfonated polyethylene may be as long as several days, although it may be reduced to as short as about 45 minutes (at 280° F) with the use of epoxy resin as the vulcanizing agent and the use of other vulcanizing agents is greatly limited. Further, the toluene solution of chlorosulfonated polyethylene is used at a solids concentration of 18 percent and is relatively high in solution viscosity for its low solids concentration. This inevitably leads to an increase in the application of the material to obtain a layer of a uniform thickness. Therefore, there are, in addition to the problem of the poisonous solvent, economical losses including the waste of the solvent and the extension of the working time.

The basic object of this invention is to provide an oil seal having on its metallic press-fit portion a coating that overcomes the aforesaid and other such difficulties ecountered with prior art materials. The present invention is concerned with the provision of an improved seal by applying a rubber-latex coating on the metallic press-fit portion of a machine element such as an oil seal and a sleeve and/or the metallic press-fit portion of the part of a machine such as the inner surface of a housing bore and the surface of a shaft, where the machine element is mounted.

Suitable latices are those of carboxylated acrylonitrile-butadiene copolymer rubbers, carboxylated styrene-butadiene copolymer rubbers, and carboxylated polyacrylic acid ester rubbers. Since latices of these rubbers are high in concentration (total solids concentration of approximately 40–50 percent), a coating of considerably sufficient thickness can be produced on the metallic press-fit surface in one application of the material and finally a coating of about 0.01 to 1 mm can be obtained. The produced coating has a long life and the latex of carboxylated rubber is especially preferred, for it bonds well to a metallic surface and is highly resistant to heat and oil relative to those of non-carboxylated rubbers. Moreover, the latex of carboxylated rubber has the advantage of being vulcanized with not only sulphur but also zinc white, melamine compound, phenol resin, etc., while the latex of non-carboxylated rubber can only be vulcanized with sulphur. In this case, the S-C bond does not afford the rubber vulcanized with sulphur good oil resistance and heat resistance.

Now, referring to the single drawing, there is shown an oil seal generally designated by the numeral 10. The oil seal 10 is press-fitted on the inner surface 12 of a static housing 14 with its two axially opposite lips 16 and 18 of resilient material in a fluid tight engagement with a metallic sleeve 20 fixed on a rotating shaft 22. The seal includes a metal reinforcing ring 24 of L-shaped cross-section consisting of a radial flange 28 and a cylindrical portion 26, on the outer cylindrical surface of which alone a thin rubber latex coating 30 is applied. The sleeve 20 is also of L-shaped cross-section consisting of a radial flange 32 and a cylindrical portion 34, on the inner cylindrical surface of which along a thin rubber latex coating 36 may similarly be applied. When the oil seal 10 and the sleeve 20 are press-fitted on the housing 14 and the shaft 22, respectively, the coatings are subject to shearing force and fill the irregularities formed on the contacting surfaces for attaining a seal between the surfaces in engagement.

The coatings 30 and 36 may be applied onto the metal surface by spraying or brushing the material on the part, the former being preferred for mass production. The vulcanization of the coating material, in case of oil seals, may be conducted at the same time as the sealing lips are vulcanized to the metal reinforcing ring.

While a coating made of a carboxylated rubber-latex according to the present invention falls within the category of rubbers described in the specification of U.S. Pat. No. 2,889,163 as unsatisfactory, the materials used have no grains on their surface. The development of grains is said to be related to the vulcanization of rubbers. The rubber-latex used in the practice of the present invention is well vulcanized with the use of vulcanizing agents usually used in the vulcanization of the same rubber, such as sulfur, zinc white, or sodium aluminate. For example, a vulcanized (at 155° C for five minutes) dry coating of Hycar 1571 (high nitrile latex, total solids concentration: 40 percent, average granule radius: 0.12 $\mu$, pH 8.0, specific gravity: 1.00, viscosity: 12 cps) shows the following properties wherein blended quantities are dry weight parts:

| Hycar 1571 | | 100 | 100 |
|---|---|---|---|
| Vulcanizing agent | zinc white (50%) | 9.0 | — |
| | sodium aluminate (5–10%) | — | 0.5 |
| strain strength (kg/cm) | | 231 | 173 |
| elongation (%) | | 730 | 920 |

A vulcanized dry coating of Hycar 1572 (medium nitrile latex, total solids concentration: 50 percent, average granule radius: 0.18 $\mu$, pH 6.5, specific gravity: 1.01, viscosity: 35 cps) has similar properties. Thus, unlike chlorosulfonated polyethylene, no particular vulcanizing agent is necessary for the vulcanization of the coating materials used in the present invention and yet there are no grains developed in the coating after curing. While the material is vulcanized with the use of an ordinary vulcanizing agent, it has a shorter vulcanizing time, for example, 30 minutes at 150° C as the optimum vulcanizing condition. Other usable vulcanizing agents are methyl compounds of trimethylol melamine, melamine compounds of dimethylol melamine, etc. Coating materials vulcanized with these agents have a very high strain strength.

The formed coating is not easily torn away from the press-fit metallic surface and is thick enough to fill scratches on the housing bore or the like. In addition, when an oil seal is snugly press-fitted in the housing bore or the like, the rubber latex coating is higher in the degree of sealing than the chlorosulfonated polyethylene coating, because the former is lower in the degree of swelling and in permanent compression set than the latter. As a rubber-latex, a mixture of different latices may be used. For example, the use of a mixture of the latex of carboxylated acrylonitrile-butadiene copolymer rubber and that of carboxylated styrene-butadiene copolymer rubber further ensured sealing because of the swelling of the carboxylated stryene-butadiene copolymer. A mixture of these rubbers is preferably used with a variety of their proportion depending upon the application.

The packing material of an oil seal, especially synthetic rubber, is usually bonded to the metallic casing with a phenolic resin as the bonding agent. Taking, for example, bonding by a phenolic resin with which rubber-latices used in the practice of the present invention have a good mutual dissolution, on the one hand, after the immersion of the metallic case into the phenolic resin, the packing material is bonded to the desired portion of the case and on the other hand, the latex can be coated on the surface of the case. This is advantageous from the standpoint of workability and yet improves the bonding of the formed coating on the metallic surface. Further, the addition of the above-mentioned melamine compound as the vulcanizing agent is advantageous in the application of the coating material, becuase it, too, has mutual dissolubility with phenolic resins.

Fillers may be added to the latex, such as hydroxide, soft clay, titanium dioxide, calcium carbonate. calcium bicarbonate, talc, etc. The fillers and the latex are preferably used in a proportion of about 50 to 200 parts to 100 parts (dry weight). The addition of more than 200 parts of filler may cause aggregation to enable the formation of the necessary coating. A small quantity of a disperser may be added to the mixture of a latex and fillers and the whole mixture crushed in a ball mill into as fine granules as the latex. A thickener, an anti-foam agent, a vulcanizing agent, a vulcanization accelerator, an anti-aging agent, a coloring agent and so forth may also be added to the coating material.

A metallic press-fit surface to be coated may be one or both of those of an oil seal and the part of a machine where it is installed but in the case of a sleeve inserted in the inner circumference of the seal lip and press-fitted on the surface of a shaft, a coating may be formed on the press-fit surface of the sleeve.

Examples of materials used for coatings in accordance with the present invention are shown in the following, wherein parts are on the dry weight basis:

EXAMPLE 1

| | |
|---|---|
| carboxylated AR (polyacrylic acid ester rubber) latex (Hycar LX811) | 100 |
| trimethylolmelamine methylate | 16 |
| organoamino salt (Sumitex ACS) | 0.25 |
| methyl cellulose | 7 |
| pigment | 4 |

The vulcanization was performed with heat treatment at 150° C for 20 minutes. The produced coating showed 97 kg/cm of tensile strength, and 840 percent of elongation.

EXAMPLE 2

| | |
|---|---|
| carboxylated NBR latex (Hycar 1571) | 50 |
| carboxylated SBR latex (Hycar 2570X5) | 50 |
| calcium bicarbonate | 50 |
| methyl cellulose | 2 |
| trimethylolmelamine methylate | 10 |
| dibasic ester sulfonate (Newcol 290) | 2 |
| organoamino salt (Sumitex ACX) | proper quantity |

The vulcanization was carried out with heat treatment at 150° C and for 15 to 30 minutes.

EXAMPLE 3

| | |
|---|---|
| carboxylated NBR latex (Hycar 1571) | 100 |
| titanium oxide | 50 |
| methyl cellulose | 5 |
| trimethylolmelamine methylate | 5 |
| organoamino salt (Sumitex ACX) | 0.25 |
| polyoxyethylenenonylphenolether (Newcol 565) | 2.5 |
| pigment | 1 |

The vulcanization was conducted with heat treatment at 150° C and for 30 minutes. The produced coating showed 105 kg/cm of tensile strength, 900 percent of elongation, + 3.3 percent of the degree of swelling in engine oil, had a better bonding to the metallic surface than those in the Examples 1 and 2.

The obtained coatings in Examples 1 to 3 had no grains on their surfaces.

For comparison, examples of chlorosulfonated polyethylene and non-carboxylated rubber latices are shown in the following examples:

EXAMPLE 4

| | |
|---|---|
| SBR latex (Hycar 2507) | 100 |
| aluminum hydroxide | 50 |
| methyl cellulose | 2 |
| trimethylmelamine methylate | 8 |
| dibasic acid ester sulfonate (Newcol) | 2 |

The vulcanization was conducted with heat treatment at 150° C and for 15 minutes. The produced coating showed 80 kg/cm of tensile strength and 520 percent of elongation.

EXAMPLE 5

| | |
|---|---|
| NBR latex (Hycar 1561) | 100 |
| aluminum hydroxide | 100 |
| trimethylolmelamine methylate | 5 |
| organoamino salt (Sumitex ACS) | 0.25 |
| dibasic ester sulfonate (Newcol 290) | 2.5 |
| methyl cellulose | 5 |

The vulcanization was performed with heat treatment at 150° C and for 15 minutes. The produced coating showed 85 kg/cm of tensile strength, 710 percent of elongation and 6 percent of the degree of swelling in engine oil.

EXAMPLE 6

A dry coating was prepared by vulcanizing at 140° C for 20 minutes the toluene solution of Hypalon 40. This coating showed 86 kg/cm of tensile strength, 550 percent of elongation, and 17.5 percent of the degree of swelling in engine oil.

In each of the above-mentioned Examples, the viscosity of the mixture was adjusted at about 50 to 100 cps and the coatings were applied by means of spray guns, brushes, immersions or the like. The applied coating was cured after finger-touch drying (room temperature or infrared ray drying).

What is claimed is:

1. An oil seal or sleeve having a metallic cylindrical surface to be press-fitted on one of two relatively rotating machine parts, said seal or sleeve having on said surface a coating consisting essentially of grain free vulcanized synthetic rubber latex, selected from the group consisting of carboxylated acrylonitrile-butadiene copolymer rubber latex, carboxylated styrene-butadiene copolymer rubber latex and carboxylated polyacrylic acid ester rubber latex, with a thickness of 0.01 mm to 1.0mm, whereby a static fluid tight engagement is achieved between said surface and the adjacent cylindrical surface of said one of said parts.

2. An oil seal or sleeve as defined in claim 1 wherein said latex has a solids concentration of 40 to 50 percent.

3. An oil seal or sleeve as defined in claim 1 wherein said coating is bonded to the metallic surface with a phenolic resin.

4. An oil seal or sleeve as defined in claim 1 wherein said coating includes from about 50 to 200 parts of a filler for each 100 parts of said latex.

* * * * *